(12) United States Patent
Lee et al.

(10) Patent No.: US 11,652,774 B2
(45) Date of Patent: *May 16, 2023

(54) METHOD AND SYSTEM FOR PRESENTING CONVERSATION THREAD

(71) Applicant: LINE Plus Corporation, Seongnam-si (KR)

(72) Inventors: Keon Hong Lee, Seongnam-si (KR); Hyukjae Jang, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,674

(22) Filed: Aug. 12, 2021

(65) Prior Publication Data

US 2021/0377198 A1 Dec. 2, 2021

Related U.S. Application Data

(63) Continuation of application No. 16/825,204, filed on Mar. 20, 2020, now Pat. No. 11,115,362.

(30) Foreign Application Priority Data

Mar. 26, 2019 (KR) .......................... 10-2019-0034392

(51) Int. Cl.
*H04L 12/00* (2006.01)
*H04L 51/216* (2022.01)
(Continued)

(52) U.S. Cl.
CPC ........ *H04L 51/216* (2022.05); *G06F 3/04812* (2013.01); *G06F 3/04883* (2013.01);
(Continued)

(58) Field of Classification Search
CPC ....... H04L 51/42; H04L 51/216; H04L 51/04; G06F 3/04812; G06F 9/546; G06F 3/04883; G06F 2203/04806; G06F 2203/04808
(Continued)

(56) References Cited

U.S. PATENT DOCUMENTS 6,330,589 B1 12/2001 Kennedy
7,941,491 B2 5/2011 Sood
(Continued)

FOREIGN PATENT DOCUMENTS

KR 10-2017-0006813 A 1/2017

*Primary Examiner* — Frantz Coby
(74) *Attorney, Agent, or Firm* — Harness, Dickey & Pierce, P.L.C.

(57) ABSTRACT

Disclosed are methods and systems for displaying a conversation thread. A conversation thread displaying method including classifying messages transmitted and received through at least one conversation session to generate a conversation thread for each of the at least one conversation session, providing a conversation session list, displaying messages of a selected conversation thread selected from the conversation session list, receiving a conversation summary request for the messages of the selected conversation thread, and providing a conversation summary for the messages of the selected conversation thread in response to the conversation summary request for the messages of the selected conversation thread may be provided.

20 Claims, 12 Drawing Sheets

(51) Int. Cl.
  *H04L 51/42* (2022.01)
  *H04L 51/04* (2022.01)
  *G06F 3/04883* (2022.01)
  *G06F 3/04812* (2022.01)
  *G06F 9/54* (2006.01)

(52) U.S. Cl.
  CPC .... *G06F 9/546* (2013.01); *G06F 2203/04806* (2013.01); *G06F 2203/04808* (2013.01); *H04L 51/04* (2013.01); *H04L 51/42* (2022.05)

(58) Field of Classification Search
  USPC .................................................. 709/206–207
  See application file for complete search history.

(56) References Cited

U.S. PATENT DOCUMENTS

| | | | |
|---|---|---|---|
| 8,978,039 | B2 | 3/2015 | Sutedja et al. |
| 9,235,864 | B1* | 1/2016 | Maeng .................... G06Q 50/01 |
| 9,317,574 | B1 | 4/2016 | Brisebois et al. |
| 9,632,996 | B2 | 4/2017 | Bastide et al. |
| 10,142,477 | B2 | 11/2018 | Khodorenko et al. |
| 10,467,630 | B2 | 11/2019 | Iyer et al. |
| 10,958,599 | B1 | 3/2021 | Penov et al. |
| 11,115,362 | B2* | 9/2021 | Lee ....................... H04L 51/216 |
| 2003/0048884 | A1 | 3/2003 | Mateu |
| 2015/0341300 | A1 | 11/2015 | Swain et al. |
| 2018/0367484 | A1 | 12/2018 | Rodriguez et al. |
| 2020/0219494 | A1* | 7/2020 | Dhoolia .................. G10L 15/16 |

\* cited by examiner

METHOD AND SYSTEM FOR PRESENTING CONVERSATION THREAD

CROSS-REFERENCE TO RELATED APPLICATIONS

This U.S. non-provisional application is a continuation of U.S. application Ser. No. 16/825,204, filed on Mar. 20, 2020, which claims the benefit of priority under 35 U.S.C. § 119 to Korean Patent Application No. 10-2019-0034392, filed Mar. 26, 2019, the entire contents of each of which are incorporated herein by reference in their entirety.

BACKGROUND

Technical Field

One or more example embodiments relate to methods, systems, apparatuses, and/or non-transitory computer readable media for displaying a conversation thread.

Related Art

Instant messages may be associated with a single conversation thread. For example, a plurality of conversations (e.g., messages) transmitted and received through a chatroom of a mobile messenger may form a single conversation thread corresponding to the chatroom. A user may receive a list of chatrooms of the user and may transmit and receive instant messages in association with a chatroom selected from the list. In general, only a last conversation of a conversation thread corresponding to a corresponding chatroom is displayed on each chatroom in a list of chatrooms provided to the user. In this case, the user may not readily verify a current conversation or previous conversations in a current chatroom. Further, even though the user joins a specific chatroom, the user may not readily verify a main conversation among other users joining the specific chatroom or a current topic of conversation in the corresponding chatroom.

SUMMARY

Some example embodiments provide conversation thread displaying methods for providing an interface of summarizing and displaying conversations of a conversation thread corresponding to a specific chatroom or conversations of a conversation thread corresponding to a specific user, computer apparatuses for performing the conversation thread displaying methods, and/or a non-transitory computer-readable record media for implementing the conversation thread displaying method on the computer apparatus in conjunction with the computer apparatus.

According to an example embodiment, a conversation thread displaying method of a computer apparatus includes classifying messages transmitted and received through at least one conversation session to generate a conversation thread for each conversation session, providing a conversation session list, the conversation session list including one or more conversation threads associated with the at least one conversation session, displaying messages of a selected conversation thread selected from the conversation session list, receiving a conversation summary request for the messages of the selected conversation thread, and providing a conversation summary for the messages of the selected conversation thread in response to the conversation summary request for the messages of the selected conversation thread.

According to an aspect of an example embodiment, a non-transitory computer-readable record medium storing instructions that, when executed by a processor, cause the processor to perform the aforementioned conversation thread displaying method.

According to an example embodiment, a computer apparatus includes at least one processor configured to execute a computer-readable instruction. The at least one processor is configured to classify messages transmitted and received through at least one conversation session to generate a conversation thread for each conversation session, provide a conversation session list, the conversation session list including one or more conversation threads associated with the at least one conversation session, display messages of a selected conversation thread selected from the conversation session list, receive a conversation summary request for the messages of the selected conversation thread, and provide a conversation summary for the messages of the selected conversation thread in response to the conversation summary request for the messages of the selected conversation thread.

According to some example embodiments, it is possible to provide an interface of summarizing and displaying conversations of a conversation thread corresponding to a specific chatroom or conversations of a conversation thread corresponding to a specific user.

DETAILED DESCRIPTION

Figure 1:
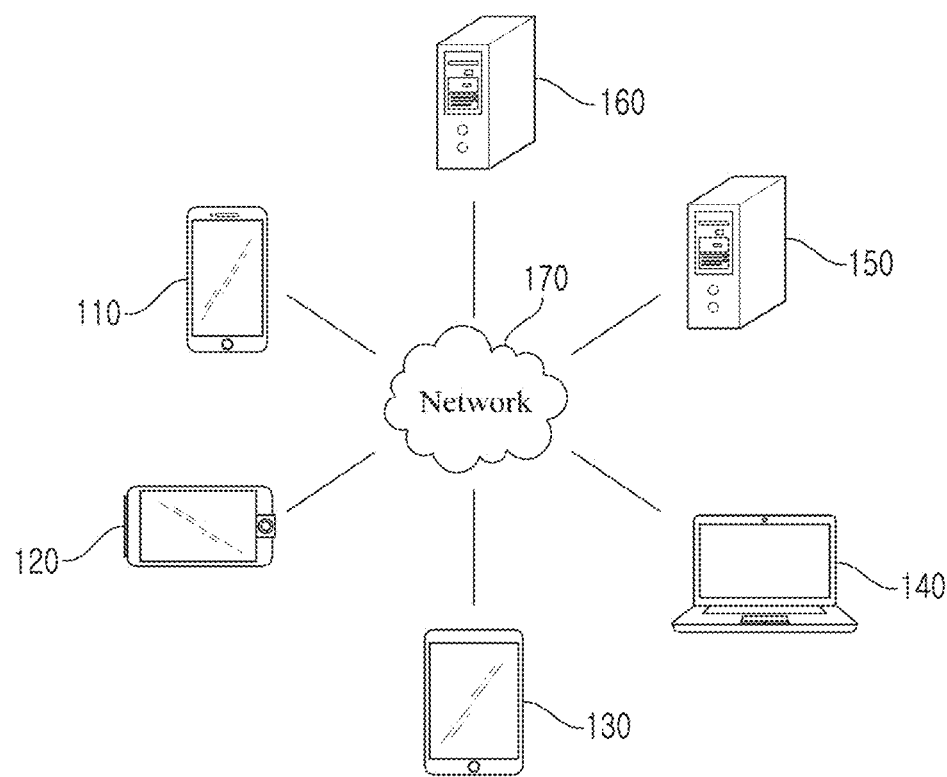
FIG. 1 is a diagram illustrating an example of a network environment according to at least one example embodiment.

One or more example embodiments will be described in detail with reference to the accompanying drawings.

Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

It will be understood that the term "and/or" includes any and all combinations of one or more of the associated listed items. Expressions such as "at least one of," when preceding a list of elements, modify the entire list of elements and do not modify the individual elements of the list. Thus, for example, both "at least one of A, B, or C" and "A, B, and/or C" means either A, B, C or any combination thereof.

Although described with reference to specific examples and drawings, modifications, additions and substitutions of the disclosed example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A conversation thread displaying system according to example embodiments may be configured through at least one computer apparatus. Here, a computer program according to an example embodiment may be installed and executed on the computer apparatus and the computer apparatus may perform a conversation thread displaying method according to example embodiments under control of the executed computer program. The aforementioned computer program may be stored on a non-transitory computer-readable record medium to implement the conversation thread displaying method on a computer in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example environment applicable to example embodiments, and environments applicable to example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, or the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited, and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, or a tree or hierarchical network. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may be a messaging service, a mail service, a social network service (SNS), a map service, a translation service, a financial service, a payment service, a search service, a content providing service, and the like.

Figure 2:
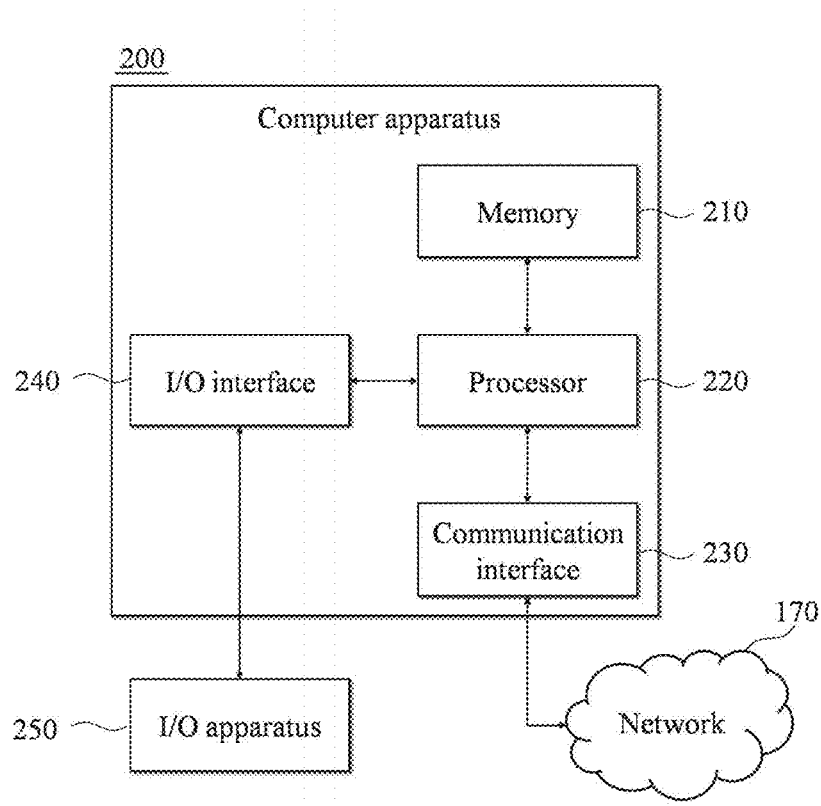
FIG. 2 is a diagram illustrating an example of a computer apparatus according to at least one example embodiment.

FIG. 2 is a block diagram illustrating an example of a computer apparatus according to at least one example embodiment. Each of the electronic devices 110, 120, 130, and 140 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device (e.g., random access memory (RAM), a read only memory (ROM), or a disk drive) as a non-transitory computer-readable record medium. The permanent mass storage device (e.g., ROM or disk drive) may be included in the computer apparatus 200 as a permanent storage device separate from the memory 210. Also, an OS or at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer apparatus 200 based on a computer program installed by files provided over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus (e.g., between a storage device of the computer apparatus 200 and a storage device of another apparatus) over the network 170. For example, the processor 220 of the computer apparatus 200 may transfer a request created based on a program code stored in the storage device such as the memory 210, an instruction data, a file, etc., to other apparatuses over the network 170 under control of the communication interface 230. Conversely, the computer apparatus 200 may receive a signal, an instruction, data, a file, etc., from another apparatus through the communication interface 230 of the computer apparatus 200 by going through the network 170. For example, a signal, an instruction, and data received through the communication interface 230 may be transferred to the processor 220 or the memory 210, and a file may be stored in a storage medium (e.g., the permanent storage device) further includable in the computer apparatus 200.

The I/O interface 240 may be circuitry configured to interface with an I/O apparatus 250. For example, an input device may include a microphone, a keyboard, or a mouse, and an output device may include a display or a speaker. As another example, the I/O interface 240 may be a device (e.g., touchscreen) in which an input function and an output function are integrated into a single function. The I/O apparatus 250 may be configured as a single device with the computer apparatus 200.

According to other example embodiments, the computer apparatus 200 may include a smaller or greater number of components than a number of components shown in FIG. 2. However, there is no need to clearly illustrate many components according to the related art. For example, the computer apparatus 200 may include another I/O apparatus 250, or may further include other components (e.g., a transceiver or a database (DB)).

Figure 3:
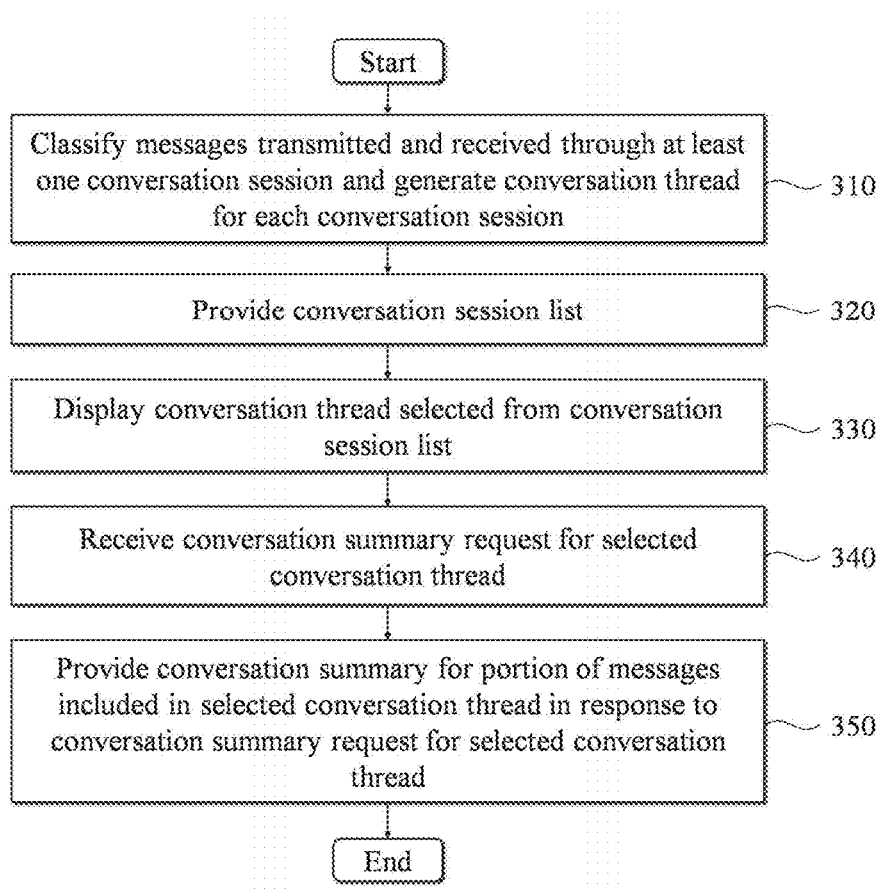
FIG. 3 is a flowchart illustrating an example of a conversation thread displaying method according to at least one example embodiment.

FIG. 3 is a flowchart illustrating an example of a conversation thread displaying method according to at least one example embodiment. The conversation thread displaying method of FIG. 3 may be performed by, for example, the aforementioned computer apparatus 200. For example, the processor 220 of the computer apparatus 200 may be configured to execute a control instruction according to a code of at least one program or a code of an OS included in the memory 210. Here, the processor 220 may control the computer apparatus 200 to perform operations 310 to 350 included in the conversation thread displaying method of FIG. 3 in response to a control instruction provided from a code stored on the computer apparatus 200.

Referring to FIG. 3, in operation 310, the computer apparatus 200 may classify messages transmitted and received through at least one conversation session and may generate a conversation thread for each conversation session. For example, in a mobile messenger environment, messages transmitted and received through a single chatroom may be generated into a single conversation thread. In this case, a conversation thread for each conversation session may correspond to messages for each chatroom.

In operation 320, the computer apparatus 200 may provide a conversation session list, which includes one or more conversation threads associated with the at least one conversation session. For example, in the mobile messenger environment, a chatroom list may be displayed on a display included in the computer apparatus 200.

In operation 330, the computer apparatus 200 may display a conversation thread (e.g., messages included in the conversation thread) for a chatroom selected from the conversation session list. For example, in response to a selection from a user of a single chatroom from the chatroom list in the mobile messenger environment, messages transmitted and received through the selected chatroom may be displayed on the display included in the computer apparatus 200. Here, only a portion of the messages included in the conversation thread may be displayed on the display, and remaining messages may be selectively displayed on the display in response to a user input.

In operation 340, the computer apparatus 200 may receive a conversation summary request for the selected conversation thread. For example, in a touchscreen environment, the conversation summary request may be input using a touch gesture of the user. For example, the conversation summary request for the conversation thread may be input using a multi-touch and drag (e.g., a pinch-to-zoom-in gesture or a pinch-to-zoom-out gesture) on a touchscreen on which the messages are displayed. Depending on some example embodiments, the conversation summary request may be input through a user interface provided in a button form on a screen. The conversation summary request may be input using various methods known to input a user instruction.

In operation 350, the computer apparatus 200 may provide a conversation summary for a portion of the messages included in the selected conversation thread in response to the conversation summary request for the selected conversation thread. For example, the computer apparatus 200 may display the conversation summary by switching a screen on which a portion of the messages included in the selected conversation thread are displayed to a screen on which the conversation summary is displayed. Here, the conversation summary may be generated using messages classified based on at least one item among a conversation thread, a period, a contact (e.g., an account, a telephone number, or a user), or a subject. In some example embodiments, at least one conversation summary generated for each period may be provided by classifying the messages of the selected conversation thread for each period based on a time at which a corresponding message is transmitted or a time at which a corresponding message is received. For example, a conversation summary for messages transmitted and received during a corresponding period may be generated for a specific period (e.g., day, week, month, or year). For example, a single conversation summary may be generated for messages of a daily basis, and the generated conversation summaries may be provided. The following example 1 represents an example of a conversation summary for messages of a daily basis, and the following example 2 represents an example of a conversation summary generated for messages of a monthly basis.

Example 1) Christmas eve (December 24)↔merry Christmas (December 25) ↔What did you do yesterday? (December 26)

Example 2) It's cold (November)↔Christmas (December)↔new year (January).

As another example, a conversation summary for each subject may be generated using messages of the same subject. As another example, a conversation summary for each contact may be generated using messages classified for each contact with whom a corresponding message is transmitted or received. Here, generating a conversation summary using messages classified based on a conversation thread may correspond to generating a conversation summary for the entire messages of the corresponding conversation thread.

As another example, a conversation summary may be generated using a desired (or, alternatively, predetermined) number of messages included in a corresponding conversation thread. For example, a conversation summary may be generated for every ten messages.

Meanwhile, a conversation summary may be generated using messages classified for two or more items. For example, a conversation summary may be generated for each contact and each period by generating the conversation summary for each contact and, here, also classifying messages transmitted and received to and from a corresponding contact for each period. As another example, a conversation summary may be generated for each group by classifying, into a group, each desired (or, alternatively, predetermined number) of currently received messages among messages included in a conversation thread, and, here, classifying a message transmitted or received within a desired (or alternatively, predetermined) time interval into the same group. For example, every ten messages among messages included in a conversation thread may be classified into a group. Here, if a twelfth message is received within 1 minute since a tenth message is received, an eleventh message and the twelfth message may be classified into a first group with the tenth message.

Further, the computer apparatus 200 may change an item in response to a request from the user. For example, the computer apparatus 200 may receive a period change request for displaying a conversation summary. In response to the period change request, the computer apparatus 200 may change a period for displaying the conversation summary from a first period (e.g., a daily basis period) to a second period (e.g., a weekly basis period), and may provide a conversation summary generated for the second period. In some example embodiments, a conversation summary for each period may be changed to a conversation summary for each subject or to a conversation summary for each contact in response to a request from the user.

The conversation summary may include, for example, information about at least one of a number of messages used for the conversation summary, a period during which the messages used for the conversation summary are transmitted or received, a contact having transmitted or received the messages used for the conversation summary, and a number of contents included in the messages used for the conversation summary for each type of content. Here, a type of content may include, for example, an emoticon, an image, a sticker, or a video. Contents may be summarized separate from a text to provide statistical information, or a text may be extracted from each content and applied to a conversation summary.

Figure 4:
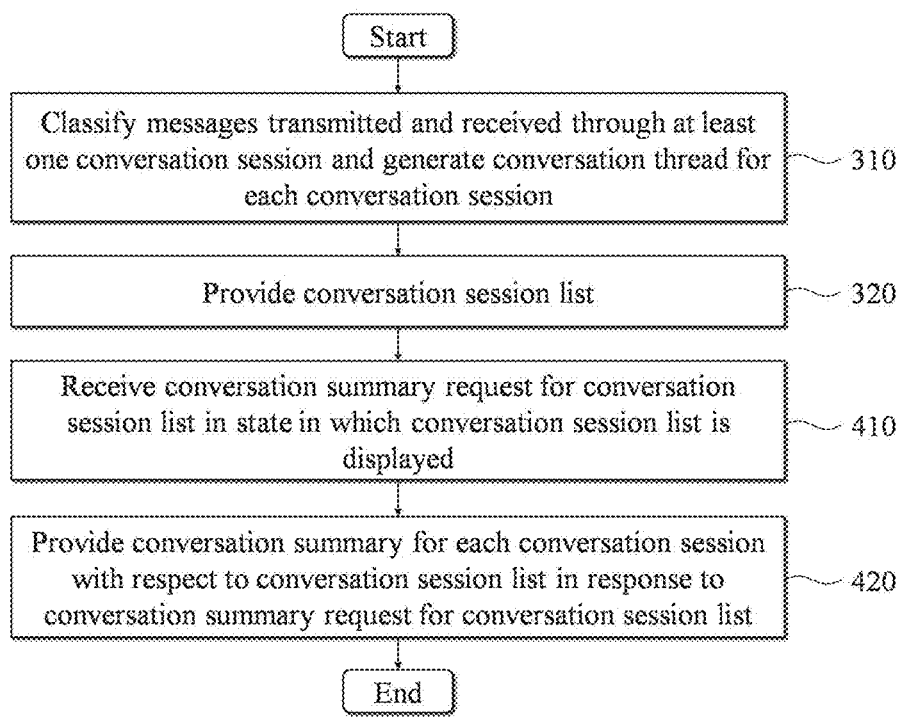
FIG. 4 is a flowchart illustrating another example of a conversation thread displaying method according to at least one example embodiment.

FIG. 4 is a flowchart illustrating another example of a conversation thread displaying method according to at least one example embodiment. Here, operations 410 and 420 may be performed after operations 310 and 320 of FIG. 3.

Referring to FIG. 4, in operation 410, the computer apparatus 200 may receive a conversation summary request for a conversation session list in a state in which the conversation session list is displayed. For example, in a touchscreen environment, the conversation summary request may be input through a touch gesture of the user. For example, the conversation summary request may be input through a multi-touch and drag (e.g., a pinch-to-zoom-in gesture or a pinch-to-zoom-out gesture) on a touchscreen on which the conversation session list is displayed. Depending on some example embodiments, the conversation summary request may be input through a user interface provided in a button form on a screen. The conversation summary request may be input using various methods known to receive a user instruction.

In operation 420, the computer apparatus 200 may provide a conversation summary for each conversation session with respect to (or included in) the conversation session list in response to the conversation summary request for the conversation session list. For example, the computer apparatus 200 may display a conversation summary for each conversation thread by switching a screen on which the conversation session list is displayed to a screen on which the conversation summary for each conversation session is displayed. Even in this case, the conversation summary may be generated using messages classified based on at least one item among a conversation thread, a period, a contact (e.g., an account, a telephone number, or a user), or a subject. For example, the computer apparatus 200 may provide a conversation summary generated using messages included in a conversation thread associated with a corresponding conversation session. Meanwhile, as described above, an item may be changed in response to a request from the user and a conversation summary of another item may be provided to the user. For example, the computer apparatus 200 may classify messages included in the same conversation thread associated with the corresponding session for each period, and may provide a conversation summary for a first period among conversation summaries generated for the respective periods using messages classified for the respective periods using the classified messages. Here, in response to a conversation summary change request for the conversation session, the computer apparatus 200 may provide a conversation session by changing the conversation summary for the first period to a conversation summary for a second period. Here, an item of a period may be changed to a contact or a subject. For example, a conversation summary for each period may be changed to a conversation summary for each contact or a conversation summary for each subject, and may be displayed in association with a single conversation thread.

Figure 5:
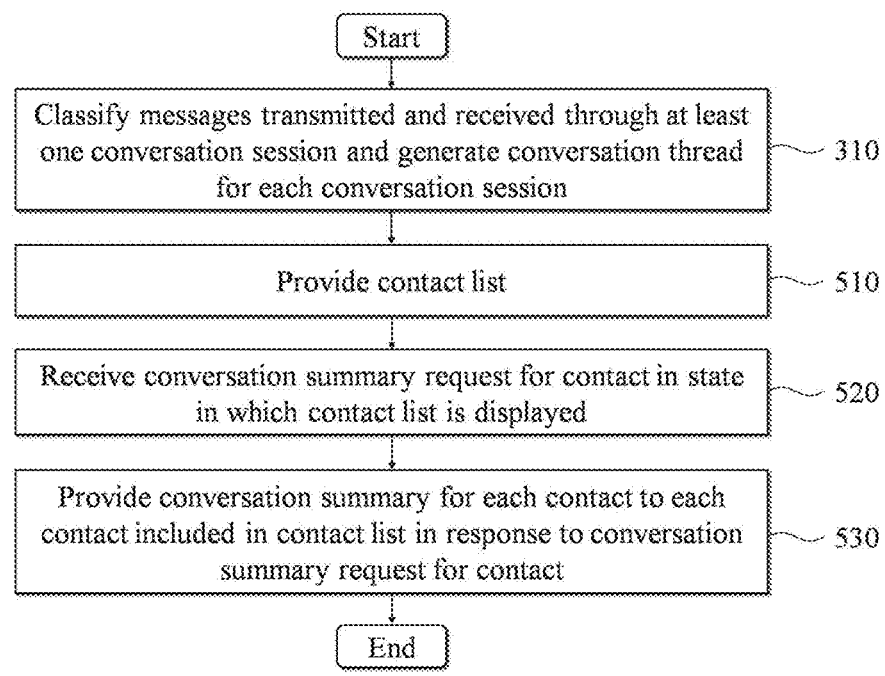
FIG. 5 is a flowchart illustrating still another example of a conversation thread displaying method according to at least one example embodiment.

FIG. 5 is a flowchart illustrating still another example of a conversation thread displaying method according to at least one example embodiment. Here, operations 510 to 530 of FIG. 5 may be performed after operation 310 of FIG. 3.

Referring to FIG. 5, in operation 510, the computer apparatus 200 may provide a contact list. The contact list may correspond to, for example, a friend list of a mobile messenger.

In operation 520, the computer apparatus 200 may receive a conversation summary request for a contact in a state in which the contact list is displayed. For example, in a touchscreen environment, the conversation summary request may be input through a touch gesture of the user. For example, the conversation summary request may be input through a multi-touch and drag (e.g., a pinch-to-zoom-in gesture or a pinch-to-zoom-out gesture) on a touchscreen on which a conversation thread list is displayed. Depending on some example embodiments, the conversation summary request may be input through a user interface provided in a button form on a screen. The conversation summary request may be input using various methods known to input a user instruction.

In operation 530, the computer apparatus 200 may provide a conversation summary for each contact to each contact included in the contact list in response to a conversation summary request for the contact. For example, the computer apparatus 200 may display a conversation summary for each contact by switching a screen on which the contact list is displayed to a screen on which the conversation summary for each contact is displayed. Depending on some example embodiments, the conversation summary may be generated using messages classified based on at least one item among a conversation thread, a period, a contact (e.g., an account, a telephone number, or a user), a number of messages, or a subject. For example, the computer apparatus 200 may provide a conversation summary generated using messages including at least one of a message received from a contact or a message transmitted to the same contact. Meanwhile, as described above, an item may be changed in response to a request from the user and a conversation summary of another item may be provided to the user. For example, the computer apparatus 200 may classify one or more messages for each period and in association with the respective contacts, and may provide a conversation summary for a first period from among conversation summaries generated for respective periods using the classified one or more messages. Here, the computer apparatus 200 may change the conversation summary for the first period to a conversation summary for a second period, and provide the conversation summary for the second period in response to a conversation summary change request for the contact. For example, a conversation summary for each period may be changed to a conversation summary for each subject or a conversation summary for each conversation thread, and may be displayed in association with a single contact.

Figure 6:
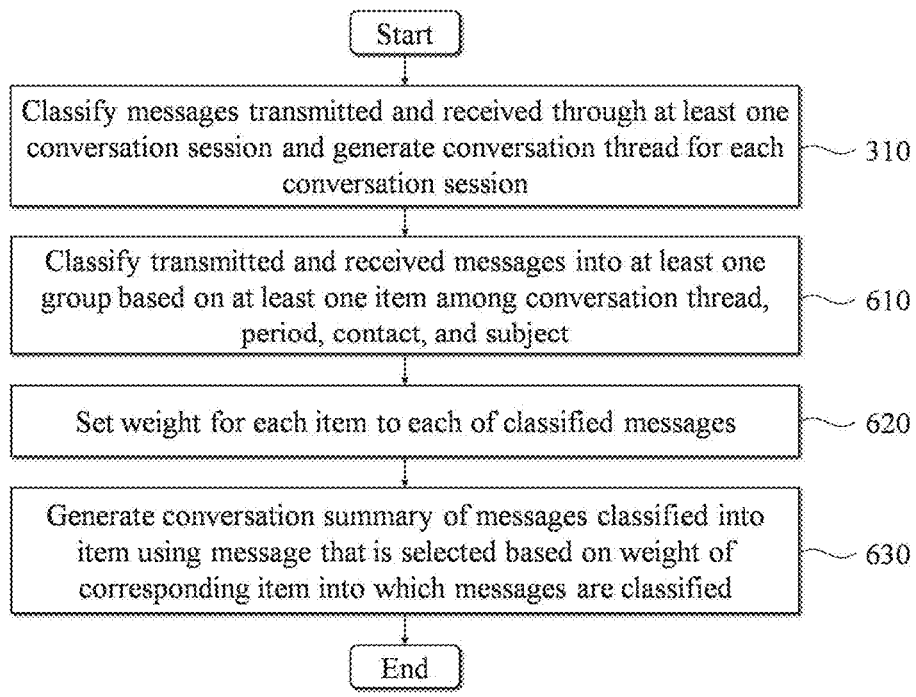
FIG. 6 is a flowchart illustrating an example of a method of generating a conversation summary according to at least one example embodiment.

FIG. 6 is a flowchart illustrating an example of a method of generating a conversation summary according to at least one example embodiment. Here, operations 610 to 630 of FIG. 6 may be performed after operation 310 of FIG. 3.

Referring to FIG. 6, in operation 610, the computer apparatus 200 may classify the transmitted and received messages into at least one group based on at least one item among a conversation thread, a period, a contact, or a subject. For example, every time the user receives or transmits a message, a conversation analyzer may run on the computer apparatus 200 as a background operation. As another example, the conversation analyzer may run on the computer apparatus 200 based on a specific point in time or a specific period set or preset by the user or a system. Here, the conversation analyzer may be a representation of a function performed by the processor 220 of the computer apparatus 200 under control of an application installed on the computer apparatus 200. The conversation analyzer may classify the transmitted and received messages based on at least one item among a conversation thread, a period, a contact, or a subject. In some example embodiments, a conversation thread may be classified by grouping messages included in the conversation thread based on a desired (or, alternatively, predetermined) number. For example, currently received messages among the messages included in a conversation thread may be grouped based on a desired (or, alternatively, predetermined) number of messages, for example, ten messages. Each piece of message group information may be stored in a database of the computer apparatus 200.

In operation 620, the computer apparatus 200 may set a weight for each item to each of the classified messages. For example, the computer apparatus 200 may set at least one of a daily basis weight, a weekly basis weight, a monthly basis weight, a yearly basis weight, a weight for each contact, a weight for each conversation thread, or a weight for each subject. For example, the computer apparatus 200 may set a weight to each of the messages classified for a specific item based on a correlation between the messages classified with respect to the specific item and a number of messages classified with respect to the specific item. For example, a weight of a new message in the specific item may differ based on a number of messages classified into the corresponding item. In some example embodiments, a relatively high weight may be set to a new message having a correlation with an existing message to which a relatively high weight is set in the corresponding item. Weights for the respective items set to the existing messages may be stored in the database for the respective items. The database may be updated at desired (or, alternatively, predetermined) periods and/or in response to an operation of the conversation analyzer.

According to some example embodiments, the messages classified in operation 610 may be reclassified based on the set weight in operation 620. For example, when messages (which includes a tenth message as the last message)

included in a conversation thread are classified into a group based on a desired (or, alternatively, predetermined) number in operation 610, a following message (e.g., an eleventh message) may be classified into a group different from that of a previous message (e.g., a tenth message). In this case, the following message (e.g., the eleventh message) may be reclassified into the same group as that of the previous message (e.g., the tenth message) in operation 620, if a relatively high weight is set to the following message based on a correlation with the previous message.

In operation 630, the computer apparatus 200 may generate a conversation summary of messages classified with respect to a desired item based on a weight of the desired item. For example, it may be assumed that a conversation summary for each period (e.g., based on a daily basis) is provided with respect to messages included in a specific conversation thread. Here, n messages having a largest daily basis weight among messages classified based on a daily basis may be used to generate a conversation summary. As another example, in the case of generating a conversation summary for each conversation thread, n messages having a largest weight for each conversation thread may be selected from among messages classified into a conversation thread A, and may be used to generate a conversation summary for the conversation thread A.

Figure 7:
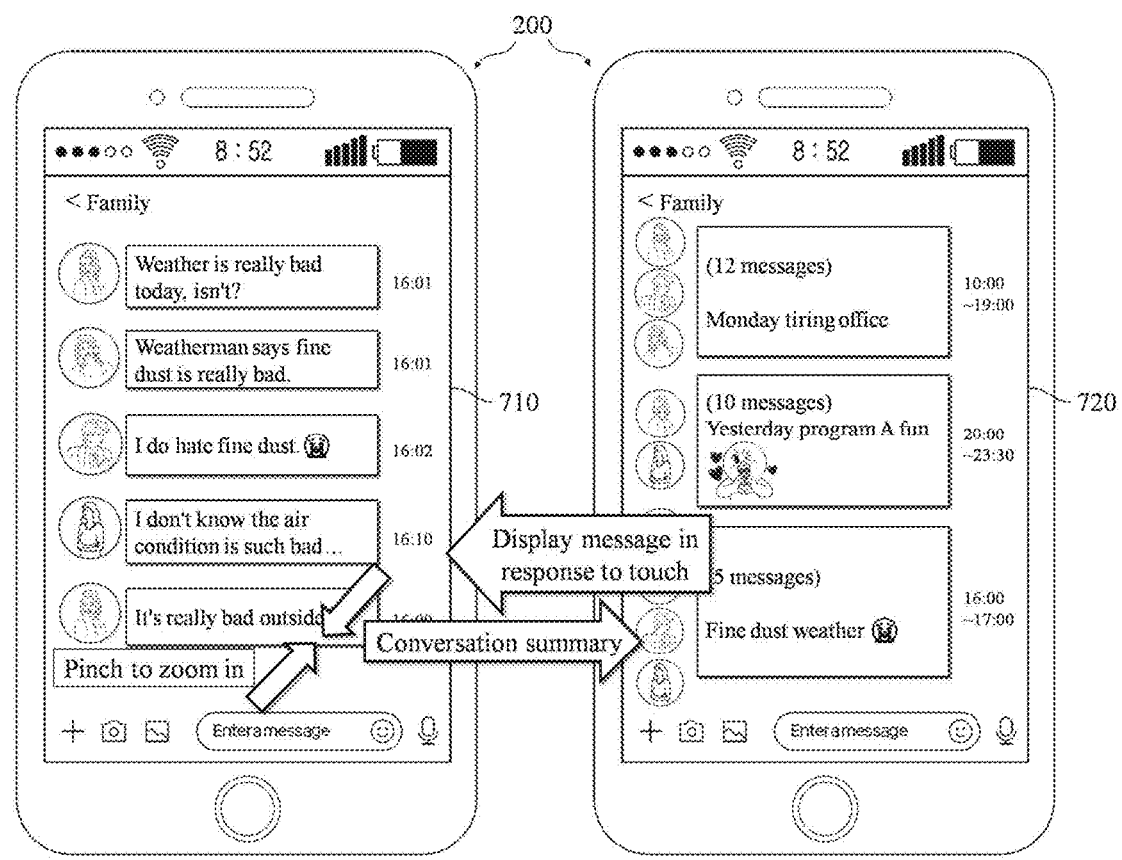
FIG. 7 illustrates an example of providing a conversation summary in response to a pinch-to-zoom-in gesture on a chatroom screen according to at least one example embodiment.

FIG. 7 illustrates an example of providing a conversation summary in response to a pinch-to-zoom-in gesture on a chatroom screen according to at least one example embodiment. Referring to FIG. 7, a portion of messages included in a specific conversation thread are displayed on a first screen 710 of the computer apparatus 200. A user may control messages to be displayed on a screen through a user gesture (e.g., an upward/downward swipe). Here, FIG. 7 illustrates an example of, in response to the computer apparatus 200 recognizing a pinch-to-zoom-in gesture on the first screen 710, providing a conversation summary by switching the first screen 710 to a second screen 720. Here, the second screen 720 represents an example of generating and providing a conversation summary based on a daily basis. In response to recognizing a pinch-to-zoom-in gesture of the user on the second screen 720, the computer apparatus 200 may change a daily conversation summary to a weekly conversation summary. The weekly conversation summary may be changed to a monthly conversation summary in response to an additional pinch-to-zoom-in gesture, and the monthly conversation summary may be changed to a yearly conversation summary in response to an additional pinch-to-zoom-in gesture. Further, in response to a selection from the user on one of daily conversation summaries displayed on the second screen 720 (e.g., in response to a touch of the user on one of daily conversation summaries in a touch-screen environment with a screen), a screen for displaying messages may be provided. Here, at least a portion of messages corresponding to the selected daily conversation summary may be displayed on a screen. If all of the messages associated with the selected daily conversation summary are not displayed on a single screen, a position corresponding to at least one message (e.g., a first message) among the messages associated with the selected daily conversation summary may be selected.

Although not illustrated, in response to recognizing a pinch-to-zoom-out gesture of the user on the second screen 720, the computer apparatus 200 may switch the second screen 720 to the first screen 710. Further, the yearly conversation summary may be changed to the monthly conversation summary in response to an additional pinch-to-zoom-out gesture, the monthly conversation summary may be changed to the weekly conversation summary in response to an additional pinch-to-zoom-out gesture, and the weekly conversation summary may be changed to the daily conversation summary in response to the additional pinch-to-zoom-out gesture.

Figure 8:
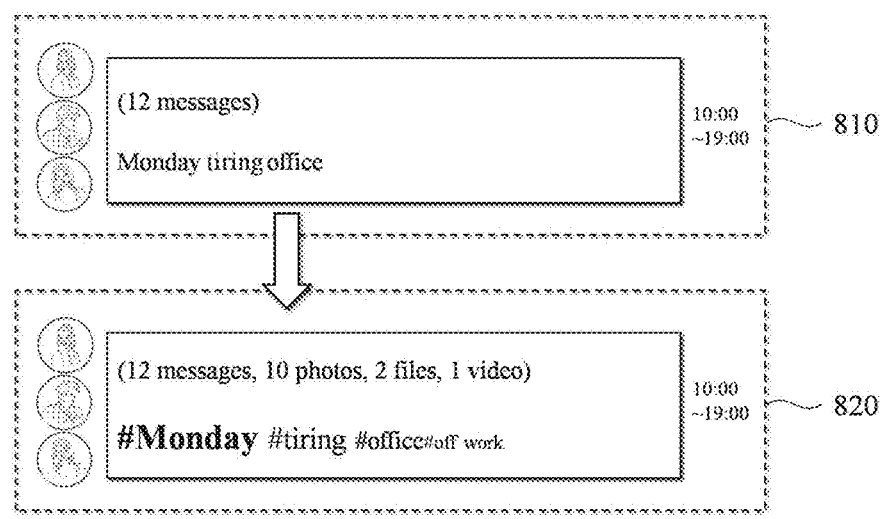
FIG. 8 illustrates an example of providing a conversation summary according to at least one example embodiment.

FIG. 8 illustrates an example of providing a conversation summary according to at least one example embodiment. Referring to FIG. 8, a first box 810 indicated with a dotted line represents an example of the conversation summary of FIG. 7. A second box 820 indicated with a dotted line represents an example of providing statistical information as another example of the conversation summary. Here, the conversation summary included in the second box 820 includes a number of messages, a number of contents for each type, and main keywords. Here, the main keywords may allow the user to further easily verify summarized contents of corresponding messages by differentiating a font size, a boldness, and/or a color, based on a number of times a corresponding main keyword appears in the messages or a weight set to each of the messages corresponding the main keyword.

Although not illustrated, in response to a selection from the user on statistical information, a message associated with the statistical information may be displayed. For example, in response to a selection from the user on "#Monday" included in the second box 820, messages associated with the main keyword "Monday" may be collected and displayed or may be highlighted to be distinguished from other messages irrelevant to the main keyword "Monday." In the case of a conversation summary of messages classified into a conversation thread A, a message used for the conversation summary may be displayed to be distinguished from a message unused for the conversation summary among the messages included in the conversation thread A, by highlighting only the message used to generate the corresponding conversation summary. In some example embodiments, only the message used to generate the corresponding conversation summary may be displayed.

Figure 9:
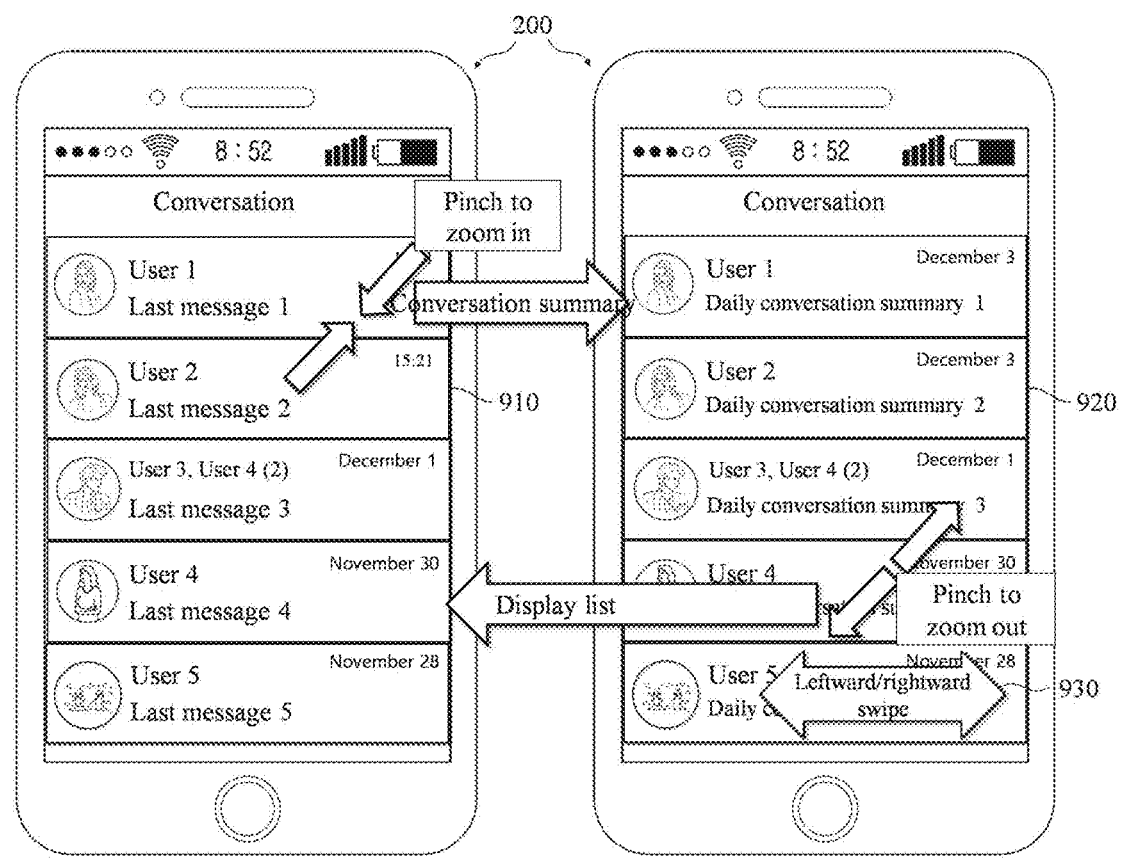
FIG. 9 illustrates an example of providing a conversation summary in response to a pinch-to-zoom-in gesture on a chatroom list according to at least one example embodiment.

FIG. 9 illustrates an example of providing a conversation summary in response to a pinch-to-zoom-in gesture on a chatroom list according to at least one example embodiment. Referring to FIG. 9, a portion of a chatroom list corresponding to each conversation thread is displayed on a third screen 910 of the computer apparatus 200. A user may control chatrooms to be displayed on a screen through a user gesture (e.g., an upward/downward swipe). Here, FIG. 9 illustrates an example of, in response to the computer apparatus 200 recognizing a pinch-to-zoom-in gesture on the third screen 910, providing a conversation summary for each chatroom (for each conversation thread) by switching the third screen 910 to a fourth screen 920. Here, the fourth screen 920 represents an example in which a conversation summary for each chatroom is a daily conversation summary. In response to recognizing a pinch-to-zoom-in gesture of the user on the fourth screen 920, the computer apparatus 200 may change the daily conversation summary to a weekly conversation summary. The weekly conversation summary may be changed to a monthly conversation summary in response to an additional pinch-to-zoom-in gesture, and the monthly conversation summary may be changed to a yearly conversation summary in response to an additional pinch-to-zoom-in gesture.

In response to recognizing a pinch-to-zoom-out gesture on the fourth screen 920, the computer apparatus 200 may display again the third screen 910 for the user. In some example embodiments, a conversation summary may be changed based on a set period in response to a leftward/ rightward swipe 930 on each of chatrooms displayed on the fourth screen 920. For example, a conversation summary may be generated on a daily basis and thereby on the fourth screen 920, and a conversation summary of November 28 may be displayed through a chatroom with a user 5 on the fourth screen 920. Here, in response to a recognizing a leftward swipe on the chatroom with the user 5, the computer apparatus 200 may display a conversation summary of November 27 instead of displaying the existing conversation summary of November 28. Thereafter, in response to recognizing a rightward swipe on the chatroom with the user 5, the computer apparatus 200 may display again (e.g., display back) the previous conversation summary of November 28, instead of displaying the conversation summary of November 27.

As another example, although not illustrated, in response to recognizing a pinch-to-zoom-in gesture on the third screen 910, the computer apparatus 200 may generate a conversation summary of a corresponding day with respect to each chatroom. For example, when messages are transmitted and received between a user 1 and a user 2 on December 3 and no message is transmitted or received among a user 3, a user 4, and the user 5 on December 3, and a pinch-to-zoom-in gesture is recognized on December 3, a conversation summary of December 3 may be generated with respect to the user 1 and the user 2 and displayed on the computer apparatus 200, and may not be displayed with respect to the user 3, the user 4, and the user 5. In response to recognizing a leftward swipe on a chatroom list in a state in which the conversation summary of December 3 is displayed with respect to the user 1 and the user 2, the computer apparatus 200 may display a conversation summary of December 2. Thereafter, in response to recognizing a rightward swipe on the chatroom list in a state in which the conversation summary of December 2 is displayed, the computer apparatus 200 may display back (e.g., display again) the conversation summary of December 3.

Figure 10:
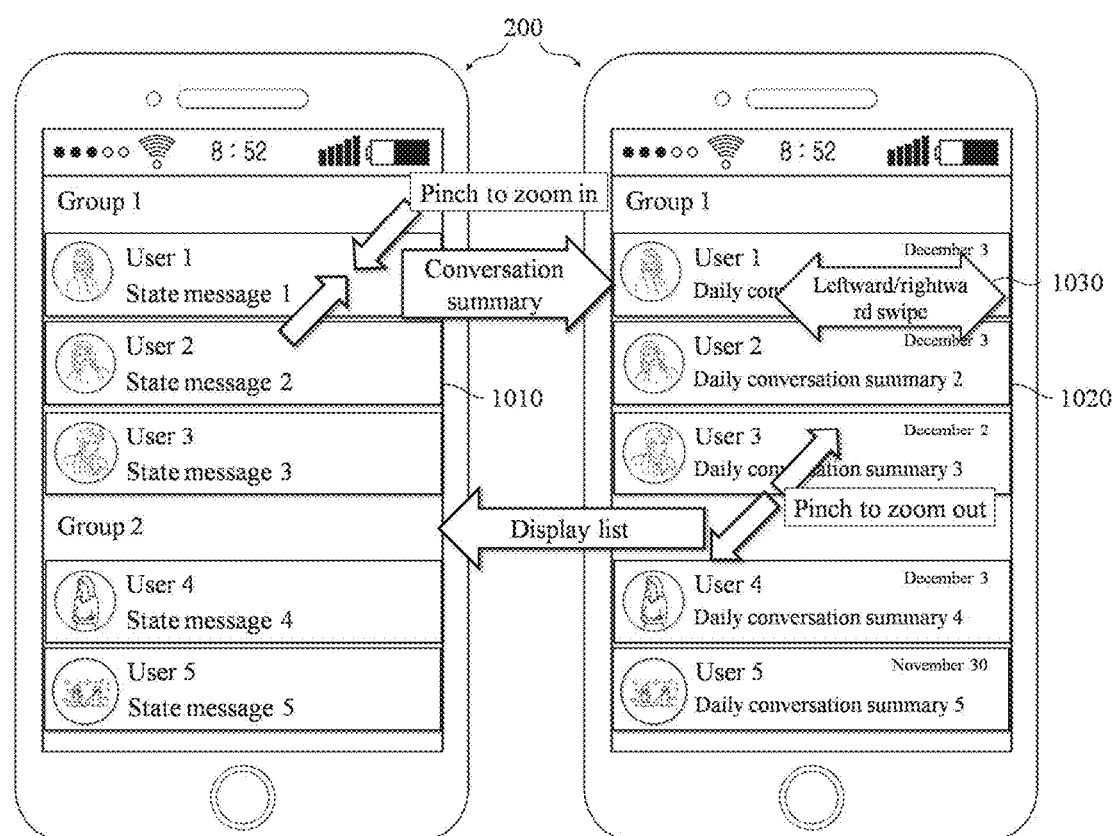
FIG. 10 illustrates an example of providing a conversation summary in response to a pinch-to-zoom-in gesture on a contact list according to at least one example embodiment.

FIG. 10 illustrates an example of providing a conversation summary in response to a pinch-to-zoom-in gesture on a contact list according to at least one example embodiment. Referring to FIG. 10, a portion of a contact list is displayed on a fifth screen 1010 of the computer apparatus 200. A user may control contacts to be displayed through a user gesture, for example, an upward/downward swipe. Here, FIG. 10 illustrates an example of, in response to the computer apparatus 200 recognizing a pinch-to-zoom-in gesture on the fifth screen 1010, providing a conversation summary for each contact by switching the fifth screen 1010 to a sixth screen 1020. Here, the sixth screen 1020 represents an example in which a conversation summary for each contact is a daily conversation summary. In response to recognizing a pinch-to-zoom-in gesture of the user on the sixth screen 1020, the computer apparatus 200 may change the daily conversation summary to a weekly conversation summary. The weekly conversation summary may be changed to a monthly conversation summary in response to an additional pinch-to-zoom-in gesture, and the monthly conversation summary may be changed to a yearly conversation summary in response to an additional pinch-to-zoom-in gesture.

In response to recognizing a pinch-to-zoom-out gesture on the sixth screen 1020, the computer apparatus 200 may display again the fifth screen 1010 for the user. In response to a leftward/rightward swipe 1030 of the user on each of contacts displayed on the sixth screen 1020, a conversation summary may be changed based on a set period basis. For example, a conversation summary is generated on a daily basis and thereby displayed on the sixth screen 1020, and a conversation summary of December 3 is displayed on the sixth screen 1020 with respect to a contact for a user 1. Here, in response to recognizing a leftward swipe on the contact for the user 1, the computer apparatus 200 may display a conversation summary of December 2 instead of displaying the existing conversation summary of December 3. Thereafter, in response to recognizing a rightward swipe on the contact for the user 1, the computer apparatus 200 may display again (e.g., display back) the conversation summary of December 3 instead of displaying the conversation summary of December 2.

As another example, although not illustrated, in response to recognizing a pinch-to-zoom-in gesture on the third screen 1010, the computer apparatus 200 may generate a conversation summary of a corresponding day for each contact. For example, when messages are transmitted and received among the user 1, a user 2, and a user 4 on December 3 and no message is transmitted and received between a user 3 and a user 5 on December 3, and, here, a pinch-to-zoom-in gesture on December 3 is recognized, a conversation summary of December 3 may be generated with respect to the user 1, the user 2, and the user 4, and displayed on the computer apparatus 200, and may not be displayed with respect to the user 3 and the user 5. In response to recognizing a leftward swipe on a chatroom list in a state in which the conversation summary of December 3 is displayed with respect to the user 1, the user 2, and the user 4, the computer apparatus 200 may display the conversation summary of December 2 with respect to the user 1 to the user 4. Thereafter, in response to recognizing a rightward swipe on the chatroom list in a state in which the conversation summary of December 2 is displayed, the computer apparatus 200 may display again (e.g., display back) the conversation summary of December 3 with respect to the user 1, the user 2, and the user 4.

Figure 11:
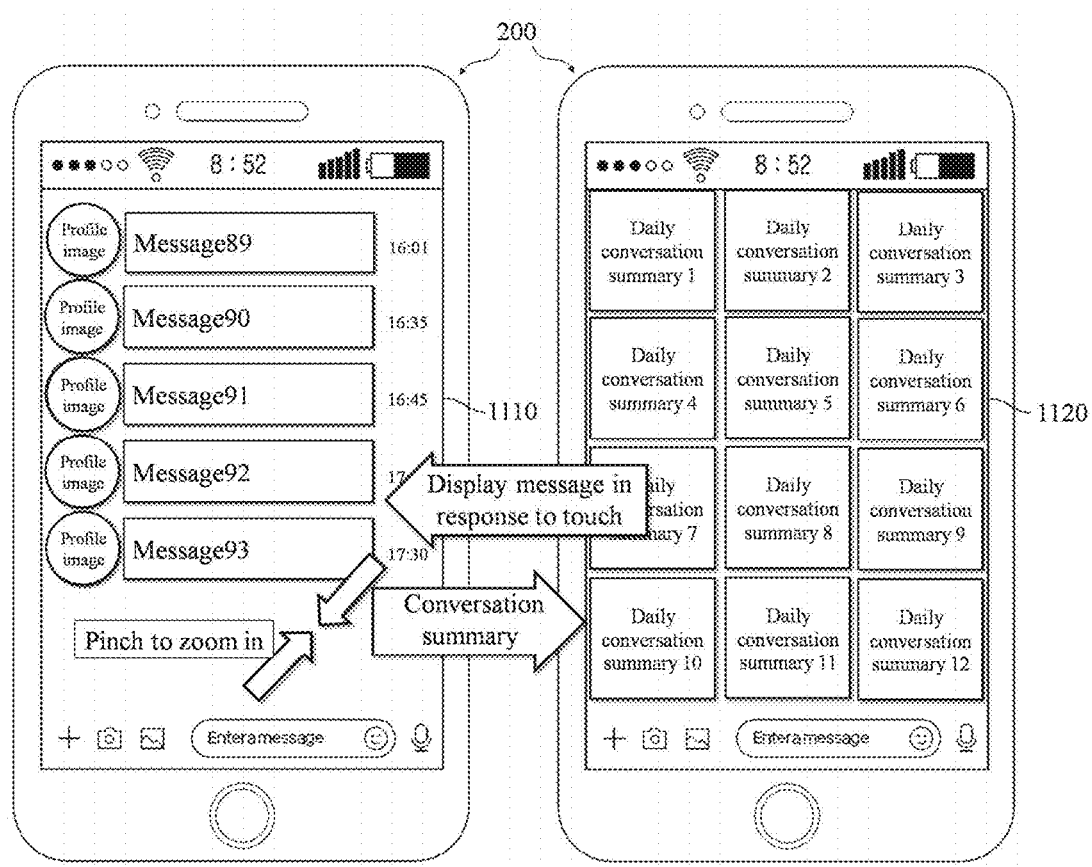
FIG. 11 illustrates another example of providing a conversation summary in response to a pinch-to-zoom-in gesture on a chatroom screen according to at least one example embodiment.

FIG. 11 illustrates another example of providing a conversation summary in response to a pinch-to-zoom-in gesture on a chatroom screen according to at least one example embodiment. Referring to FIG. 11, a portion of messages included in a specific conversation thread are displayed on a seventh screen 1110 of the computer apparatus 200. A user may control messages to be displayed on a screen through a user gesture, for example, an upward/downward swipe. Here, FIG. 11 illustrates an example of, in response to the computer apparatus 200 recognizing a pinch-to-zoom-in gesture on the seventh screen 1110, providing a conversation summary by switching the seventh screen 1110 to an eighth screen 1120. Here, the eighth screen 1120 represents an example of generating a conversation summary on a daily basis and displaying the same in a grid form. In response to recognizing a pinch-to-zoom-in gesture of the user on the eighth screen 1120, the computer apparatus 200 may change a daily conversation summary to a weekly conversation summary. The weekly conversation summary may be changed to a monthly conversation summary in response to an additional pinch-to-zoom-in gesture, and the monthly conversation summary may be changed to a yearly conversation summary in response to an additional pinch-to-zoom-in gesture.

In response to a selection from the user on one of daily conversation summaries displayed on the eighth screen 1120, for example, in response to a touch of the user with a finger on a region, on which one of the daily conversation summaries is displayed, in a touchscreen environment, a screen for displaying messages may be provided. Here, at least a portion of messages corresponding to the selected daily conversation summary may be displayed on a screen.

If all of the messages associated with the selected daily conversation summary are not displayed on a single screen, a position corresponding to at least one message (e.g., a first message) among the messages associated with the selected daily conversation summary may be selected.

Although each daily conversation summary is displayed with the same size of region on the eighth screen 1120, each daily conversation summary may be displayed with a different size based on statistical information or a number of messages associated with a corresponding conversation summary. According to some example embodiments, in response to a selection on a conversation summary, only messages associated with the selected conversation summary may be displayed, or a message associated with the conversation summary among the entire messages may be distinguishably displayed. For example, in response to a selection on "daily conversation summary 1" on the eighth screen 1120, a message associated with "daily conversation summary 1" may be displayed on a separate screen or may be highlighted on the seventh screen 1110.

Figure 12:
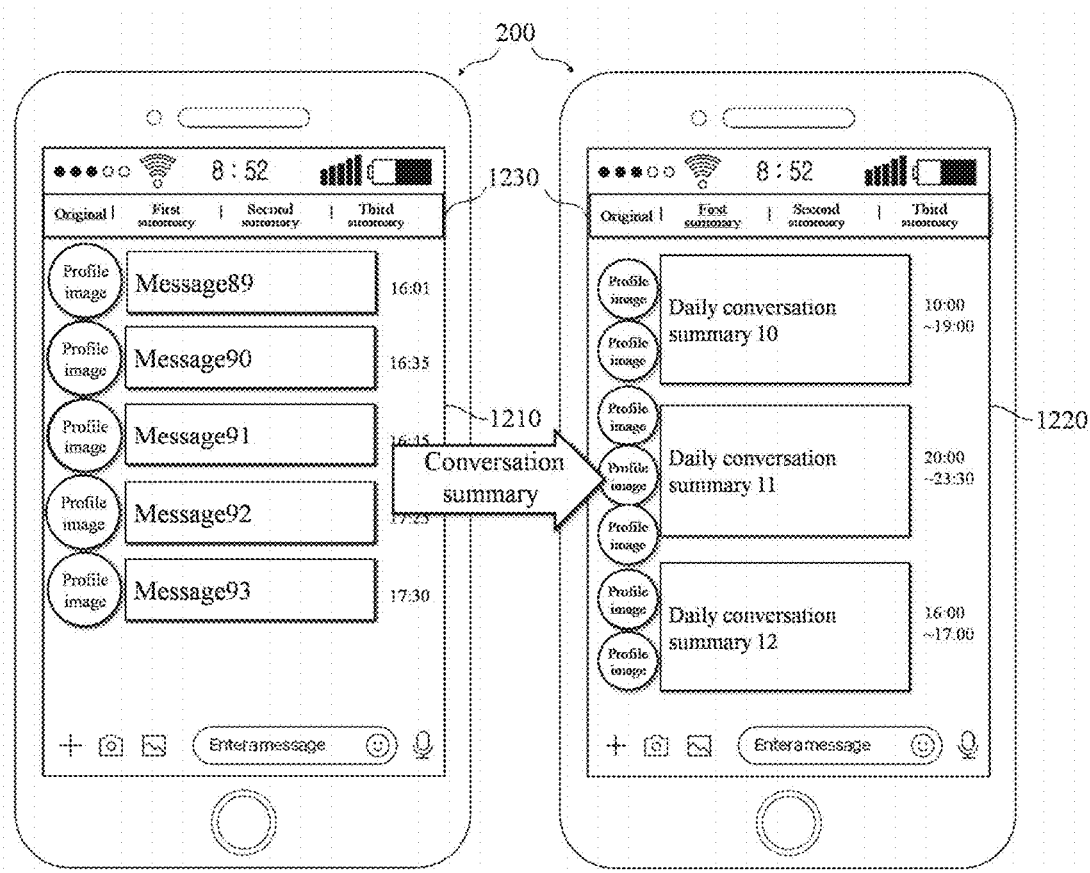
FIG. 12 illustrates still another example of providing a conversation summary in response to a pinch-to-zoom-in gesture on a chatroom screen according to at least one example embodiment.

FIG. 12 illustrates another example of providing a conversation summary in response to a pinch-to-zoom-in gesture on a chatroom screen according to at least one example embodiment. Referring to FIG. 12, a portion of messages included in a specific conversation thread are displayed on a ninth screen 1210 of the computer apparatus 200. A user may control messages to be displayed on a screen through a user gesture (e.g., an upward/downward swipe). Here, FIG. 12 illustrates an example in which the computer apparatus 200 provides a user interface 1230 for providing a conversation summary for each item. For example, in response to a selection from the user on "first summary" through the user interface 1230, for example, in response to a touch of the user with a finger on a region on which "first summary" is displayed in a touchscreen environment, the ninth screen 1210 may be switched to a screen for providing a conversation summary for each item corresponding to "first summary," for example, a tenth screen 1220. Here, although FIG. 12 illustrates fourth selection interfaces, such as, "original," "first summary," "second summary," and "third summary," it is provided as an example only. A number of selection interfaces is not limited thereto and each corresponding item may be changed based on example embodiments. For example, in FIG. 12, a daily conversation summary corresponds to "first summary." Accordingly, in response to the selection from the user on "first summary" through the user interface 1230, daily conversation summaries are displayed on the tenth screen 1220. If a weekly conversation summary and a monthly conversation summary are set with respect to "second summary" and "third summary," respectively, the weekly conversation summary for messages may be displayed in response to a selection on "second summary" and the monthly conversation summary for messages may be displayed in response to a selection on "third summary." If a conversation summary for each contact corresponds to "second summary," a conversation summary for each contact for messages may be displayed in response to a selection on "second summary."

As described above, request methods and/or display methods for a conversation summary may be variously set depending on example embodiments.

According to some example embodiments, it is possible to provide an interface of summarizing and thereby displaying conversations of a conversation thread corresponding to a specific chatroom or conversations of a conversation thread corresponding to a specific user.

The systems or apparatuses described above may be implemented using hardware and/or a combination of hardware and software. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors, distributed processors, a cloud computing configuration, etc. Moreover, each processor of the at least one processor may be a multi-core processor, but the example embodiments are not limited thereto.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media may include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes some specific example embodiments, it will be apparent to one of ordinary skill in the art that various alterations and modifications in form and details may be made in the disclosed example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A conversation thread displaying method of a computer apparatus comprising at least one processor, the method comprising:
   classifying, by the at least one processor, messages transmitted and received through at least one conversation session to generate a conversation thread for each of the at least one conversation session;
   providing, by the at least one processor, a conversation session list, the conversation session list including one or more conversation threads associated with the at least one conversation session;
   displaying, by the at least one processor, messages of a selected conversation thread selected from the conversation session list;
   receiving, by the at least one processor, a first conversation summary request for the messages of the selected conversation thread; and
   providing, by the at least one processor, a first conversation summary for the messages of the selected conversation thread in response to the first conversation summary request for the messages of the selected conversation thread,
   wherein the first conversation summary includes at least some of a number of messages, a number of contents for each type, or main keywords for the messages of the selected conversation thread.

2. The method of claim 1, wherein the providing a first conversation summary comprises providing at least one first conversation summary generated for each period by classifying the messages of the selected conversation thread for each period based on a time at which a corresponding message is transmitted or a time at which a corresponding message is received.

3. The method of claim 2, further comprising:
   receiving, by the at least one processor, a period change request for displaying the first conversation summary,
   wherein the providing a first conversation summary comprises changing a period for displaying the first conversation summary from a first period to a second period in response to the period change request, and providing the first conversation summary generated for the second period.

4. The method of claim 1, wherein the providing a first conversation summary comprises displaying the first conversation summary by switching a first screen on which a portion of the messages included in the selected conversation thread are displayed to a second screen on which the first conversation summary is displayed.

5. The method of claim 1, further comprising:
   receiving, by the at least one processor, a second conversation summary request for each conversation session included in the conversation session list in a state in which the conversation session list is displayed; and
   providing by the at least one processor, a second conversation summary for each conversation session included in the conversation session list in response to the second conversation summary request for the conversation session list.

6. The method of claim 5, wherein the providing a second conversation summary for each conversation session comprises providing a conversation summary generated using messages included in a conversation thread associated with a corresponding conversation session.

7. The method of claim 6, wherein the providing a second conversation summary for each conversation session comprises:
   classifying the messages included in the conversation thread associated with the corresponding conversation session for each period;
   providing the second conversation summary for a first period among conversation summaries generated for respective periods using the classified messages; and
   in response to a conversation summary change request, changing the second conversation summary for the first period to the second conversation summary for a second period and providing the second conversation summary for the second period.

8. The method of claim 5, wherein the providing a second conversation summary for each conversation session comprises displaying the second conversation summary for each conversation session by switching a screen on which the conversation session list is displayed to a screen on which the second conversation summary for each conversation session is displayed.

9. The method of claim 1, further comprising:
   providing, by the at least one processor, a contact list;
   receiving, by the at least one processor, a third conversation summary request for a contact in a state in which the contact list is displayed; and
   providing, by the at least one processor, a third conversation summary of messages for each contact included in the contact list in response to the third conversation summary request for the contact.

10. The method of claim 9, wherein the providing a third conversation summary for each contact comprises providing the third conversation summary generated using one or more messages comprising at least one of a message received from a contact or a message transmitted to the same contact, with respect to respective contacts.

11. The method of claim 10, wherein the providing a third conversation summary for each contact comprises:
    classifying the one or more messages for each period and in association with the respective contacts;
    providing the third conversation summary for a first period from among conversation summaries generated for respective periods using the classified one or more messages;
    changing the third conversation summary for the first period to the third conversation summary for a second period; and
    providing the third conversation summary for the second period in response to a conversation summary change request for the contact.

12. The method of claim 9, wherein the providing a third conversation summary for each contact comprises displaying the third conversation summary for each contact by switching a screen on which the contact list is displayed to a screen on which the third conversation summary for each contact is displayed.

13. The method of claim 1, further comprising:
    classifying, by the at least one processor, the transmitted and received messages based on at least one item among the conversation thread, a period, a contact, a number of messages, or a subject;

setting, by the at least one processor, a weight for each item to each of the classified transmitted and received messages; and generating, by the at least one processor, a fourth conversation summary of messages classified into a desired item based on the weight of the desired item.

14. The method of claim 13, wherein the setting a weight for each item comprises setting the weight to each of messages classified into a specific item based on a correlation between the messages classified into the specific item and a number of the messages classified into the specific item.

15. The method of claim 1, wherein the first conversation summary comprises information about at least one of a number of the messages used for the first conversation summary, a period during which the messages used for the first conversation summary are transmitted or received, and a contact having transmitted or received the messages used for the first conversation summary.

16. A non-transitory computer-readable record medium storing instructions that, when executed by a processor, cause a computer apparatus to perform the method of claim 1.

17. A computer apparatus comprising:

at least one processor configured to execute a computer-readable instruction, wherein the at least one processor is configured to, classify messages transmitted and received through at least one conversation session to generate a conversation thread for each of the at least one conversation session, provide a conversation session list, the conversation session list including one or more conversation threads associated with the at least one conversation session, display messages of a selected conversation thread selected from the conversation session list, receive a conversation summary request for the messages of the selected conversation thread, and provide a conversation summary for the messages of the selected conversation thread in response to the conversation summary request for the messages of the selected conversation thread.

18. The computer apparatus of claim 17, wherein the at least one processor is further configured to provide at least one conversation summary generated for each period by classifying the messages of the selected conversation thread for each period based on a time at which a corresponding message is transmitted or a time at which a corresponding message is received.

19. The computer apparatus of claim 17, wherein the at least one processor is further configured to, receive a second conversation summary request for each conversation session included in the conversation session list in a state in which the conversation session list is displayed, and provide a second conversation summary for each conversation session included in the conversation session list in response to the second conversation summary request for the conversation session list.

20. The method of claim 1, wherein the first conversation summary request is a request for providing the first conversation summary for the messages of the selected conversation thread.

* * * * *